Dec. 30, 1958 A. D. GUNDERSON 2,866,391
PANTOGRAPH MILLING MACHINE
Original Filed Jan. 31, 1955

INVENTOR:
Allen D. Gunderson
BY Peck + Peck
ATTORNEYS.

Dec. 30, 1958

A. D. GUNDERSON 2,866,391

PANTOGRAPH MILLING MACHINE

Original Filed Jan. 31, 1955

INVENTOR:
Allen D. Gunderson

BY Peck + Peck

ATTORNEYS.

Dec. 30, 1958 A. D. GUNDERSON 2,866,391
PANTOGRAPH MILLING MACHINE
Original Filed Jan. 31, 1955

INVENTOR:
Allen D. Gunderson
BY Peck + Peck
ATTORNEYS

Dec. 30, 1958  A. D. GUNDERSON  2,866,391
PANTOGRAPH MILLING MACHINE
Original Filed Jan. 31, 1955  7 Sheets-Sheet 6

INVENTOR:
Allen D. Gunderson
BY Peck & Peck
ATTORNEYS.

Dec. 30, 1958  A. D. GUNDERSON  2,866,391
PANTOGRAPH MILLING MACHINE
Original Filed Jan. 31, 1955   7 Sheets-Sheet 7

INVENTOR:
Allen D. Gunderson
BY Peck + Peck
ATTORNEYS.

United States Patent Office 2,866,391
Patented Dec. 30, 1958

2,866,391

PANTOGRAPH MILLING MACHINE

Allen D. Gunderson, Racine, Wis., assignor to George Gorton Machine Co., Racine, Wis., a corporation of Wisconsin Original application January 31, 1955, Serial No. 484,992. Divided and this application May 21, 1957, Serial No. 660,647

14 Claims. (Cl. 90—62)

This invention relates to pantograph milling machines; and the nature and objects of the invention and the several features thereof will be readily recognized and understood by those skilled in the art in the light of the following explanation and detailed description of the accompanying drawings illustrating what I now believe to be a preferred embodiment or mechanical expression of my invention, from among various other forms, embodiments, constructions and combinations of which the invention is capable within the broad spirit and scope thereof as defined by the claims hereto appended.

This application is filed as a division of my copending application filed January 31, 1955, Serial No. 484,992, for Index Type Multiple Spindle Pantograph Machine.

It is a general object of my invention to provide an improved pantograph type milling machine.

Another object is to provide an improved power driven master unit for pantograph type milling machines.

A further object is to provide a power driven master unit which will have a high degree of accuracy in operation for effecting precise movements of a tool actuated and controlled thereby in scaled reproduction of the master or pattern provided by such powered master unit.

A further object is to provide an adjustable mounting arrangement for a powered master unit by which a wide range of adjustments may be obtained for practical, efficient operations of the master unit for a variety of work pieces and reproducing operations to be performed thereon.

A further object is to provide a powered master unit having a reversible, infinitely variable speed drive so that the rate of movement of the reproducing tool through a work piece may be controlled over an infinite range to meet the requirements of the work piece and the reproducing operations being performed thereon, and further so that the direction of movement of a tool through the work piece may be reversed.

A further object is to provide a powered master unit having an endless, power driven chain drive for moving a stylus in tracing engagement along a master profile surface separate and spaced from the power driven chain drive.

A further object is to provide such a powered master unit having a stylus driven by an endless chain drive separate and spaced from the master profile surface, in which the stylus is continuously biased into tracing engagement and is movable radially relative to the chain drive while being positively driven by the chain drive along the master profile surface.

Another object is to provide a pantograph type milling machine with a tool or cutter spindle down feed mechanism in which a cutter head and cutter spindle unit is engaged by a forming guide which is power fed by the down feed mechanism to feed the cutter spindle.

A further object is to provide such a power fed forming guide of a down feed mechanism with a mounting having a cross-compound adjustment for facilitating accuracy of adjustment and wide range of set-up for the forming guide.

A further object is to provide an infinite variable speed control for such powered down feed mechanism.

Another object is to provide such a powered down feed mechanism having a power fed forming guide by which three-dimensional reproduction may be efficiently carried out with the forming guide controlling reproduction in the third dimension.

With the foregoing and various other objects, features and results in view which will be readily recognized from the following detailed description and explanation, my invention consists in certain novel features in design, construction and combinations as will be fully referred to and specified hereinafter.

Referring to the accompanying drawings in which similar reference characters refer to corresponding parts and elements throughout the several figures thereof;

Fig. 8 is a view in top plan of the down feed mechanism of Fig. 7, with the down feed cam housing being shown in horizontal section.

Fig. 9 is a detail view in vertical section showing the tracer spindle in operative connection with the chain drive therefor of the powered master unit of the pantograph milling machine of Fig. 1.

Figure 1:
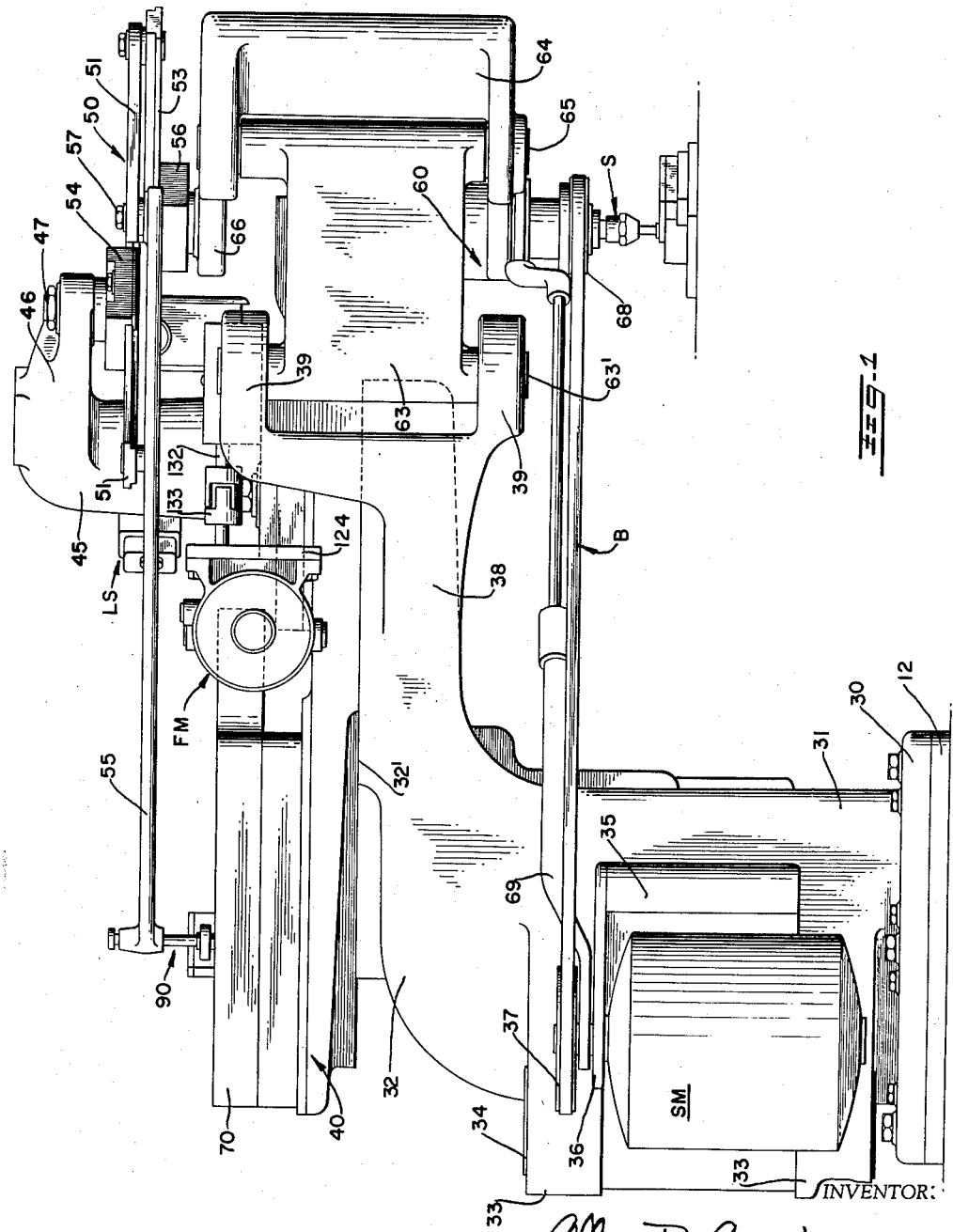
Fig. 1 is a view in side elevation of the pantograph milling machine of my invention, taken as from the left-hand side when facing the machine.

One form of pantograph milling machine has been selected and disclosed herein as an example embodiment of my invention for purposes of describing and explaining the invention and the various features thereof. This example machine of the invention, referring now to Fig. 1 of the drawings, happens to be of a type for mounting on a separate, elevated structure such as a platform, table or the like identified generally by the reference character 12. However, this is in no sense a limitation as, if desired, a machine of the invention may include the usual floor supported vertical column or frame structure for positioning the machine at the desired height. The example machine includes a frame structure which provides the base 30 by which the machine is securely mounted and attached in rigid position on and to the upper side of a suitable supporting structure, such for example as the elevated structure 12 identified in Fig. 1. A vertically disposed column 31 extends upwardly from base 30 and terminates at its upper end in a forwardly and inwardly extending neck 32. The column 31 and its neck 32 are preferably cast or otherwise formed integral as a unit structure. A longitudinally disposed slideway 32' is provided on the upper side of the neck 32 extending thereacross from end to end thereof. The column 31 has cast integrally therewith, or otherwise provided thereon, the horizontally disposed, vertically spaced ears 33. These ears 33 are positioned on one side of the column 31 and extend outwardly therefrom in angular relation therewith. In this particular instance these spaced ears 33 on the column 31 extend from the left-hand side thereof when facing the front of the machine. The ears 33 form a bracket structure in and between which there is journalled a pivot shaft 34 for rotation about a vertical axis. The pivot shaft 34 is formed on or carries the inner end of a motor mounting arm 35 which extends outwardly from the ears 33. The outer end of the arm 35 mounts and supports the spindle driving motor SM. The motor mounting arm 35 is provided with a laterally extending mounting plate 36 adjacent the outer end thereof which mounts thereon at the outer side of the arm 35, the motor SM in position with its armature or driving shaft vertically disposed and extending through the mounting plate. A pulley 37 is mounted on the upper end of the driving shaft of the motor SM above the plate 36. Thus the spindle driving motor SM is mounted and carried between arm 35 and the pivot shaft 34 for horizontal swinging through an arcuate path in either direction about the axis of shaft 34.

On the same side of the column neck 32 at which the motor mounting ears 33 are located but adjacent the inner end of the neck 32, there is provided an outwardly extending horizontally disposed arm 38. Horizontally disposed, vertically spaced ears 39 are provided on the cutter head and cutter spindle carrying links which are actuated by the pantograph linkage of the machine, as will be described and explained hereinafter in detail.

Figure 3:
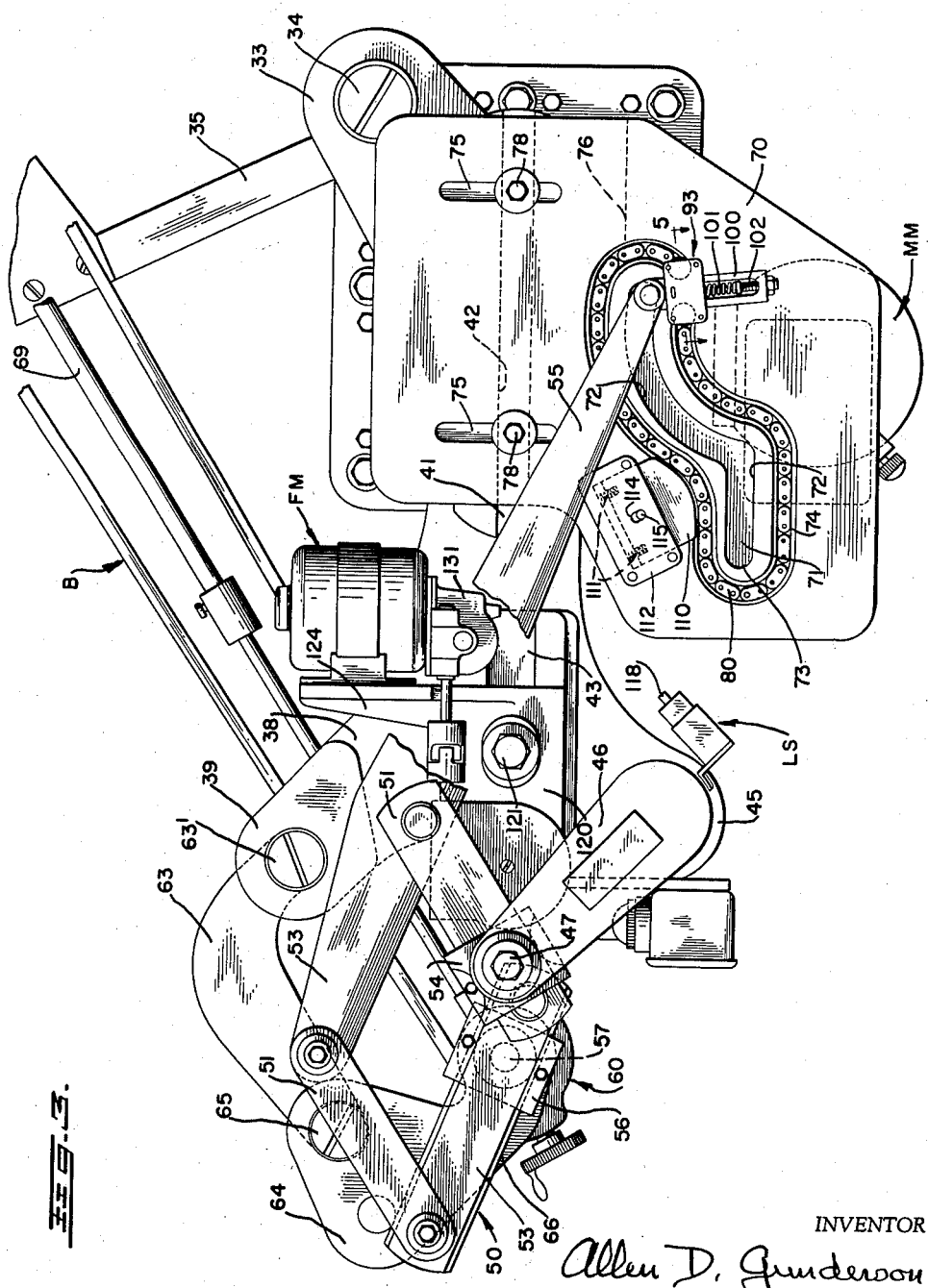
Fig. 3 is a view in top plan of the machine of Fig. 1, showing particularly the powered master unit and the pantograph assembly controlled and operated thereby.

A slider head 40 is mounted on and slidably received in the groove or slideway 32' on the upper side of the neck 32 of the example machine. The slider head 40 is an elongated member having a length relative to the column 31 and its neck 32 such that in normal position the inner end thereof extends a slight distance radially inwardly over and above the upper end of the column 31 and its neck 32. The outer length portion of the slider head 40 is provided with a longtudinal groove or slideway 41 thereacross with a slot 42 extending through the slideway for a substantial portion of the length thereof. The slider head 40 is provided with another groove or slideway therein disposed longtudinally thereof and extending inwardly from the inner end of the slideway 42, as will be clear by reference to Figs. 3 and 4. The inner end length slideway 43 of the slider head 40 is provided with a slot 44 through the head for a distance along the bottom of the slideway for a purpose to be hereinafter described.

The slider head 40 has extending from one side thereof in laterally offset relation thereto, in this instance the right hand side when facing the machine, a column or post 45 which is cast integral with the slider head and which extends vertically upwardly spaced to one side of the slideway 43 adjacent the forward end of the slider head. A hanger arm 46 is formed integral with the upper end of the post 45 and extends forwardly therefrom in horizontally disposed position over and across the adjacent forward end of the slider head 40. The forward end of the hanger arm 46 mounts therein a pivot pin or stud 47 which is adapted to pivotally mount thereon the pantograph linkage 50 of the machine.

The example pantograph milling machine of the invention herein disclosed, is provided with a pantograph linkage 50 of the parallelogram type which includes the upper parallel bars 51 pivotally coupled at their opposite ends to the adjacent ends of the parallel lower bars 53. The pantograph linkage 50 is pivotally hung and supported in horizontally disposed position from the underside of the hanger arm 46 of the slider head 40 by the pivot pin or stud 47 which pivotally connects with the usual slider block 54 on the adjacent upper bar 51 of the pantograph linkage. Thus mounted, the pantograph linkage 50 is swingable in a horizontal plane about the pivot pin or stud 47 as an axis. One of the lower bars 53 is extended outwardly across and above the slider head 40 to provide the outwardly extending tracer arm 55. The pantograph linkage 50 which is controlled and operated about the pivot pin or stud 47 by the tracer arms 55, is adapted to be coupled to a cutter head or cutter spindle barrel 60 which mounts and journals therein, the rotary cutter spindle S.

The cutter spindle S of the example machine is mounted by a cutter head assembly 60 for operation under the dictation and control of the pantograph linkage 50. In this instance the cutter spindle S is mounted and journalled in the cutter head assembly or unit 60. The cutter head and cutter spindle unit 60 includes the barrel or casing 61 having at the upper end thereof and located axially thereon the vertically upwardly extending follower point or guide pin 62. The cutter spindle S is journalled in the casing 61 to form therewith a unit cutter head assembly 60 which is adapted to be mounted in the machine in position with the cutter spindle S vertically disposed and axially aligned with the follower or guide pin 62 at the upper side of the cutter head unit 60. In certain instances the cutter spindle is mounted in the barrel or casing 61 of a cutter head and spindle unit 60 for vertical axial movements therein, while in other instances such a cutter head and spindle unit 60 is mounted for vertical displacement bodily as a unit on the structure on which mounted to thereby vertically axially displace and raise and lower the cutter spindle from and to its operative position. As the specific construction of the cutter head and cutter spindle unit utilized forms no part of my present invention, except insofar as the unit is located and functions in integrated and combined relationship in a machine organization of the invention, it is not believed necessary to make any detailed disclosure thereof herein. Such cutter head and spindle units are known to the art and are in use, being exemplified by such U. S. Patents as Nos. 1,562,237, 1,956,505, 1,959,269, 2,000,838, 2,557,876, 2,645,161 and 2,658,423.

Figure 2:
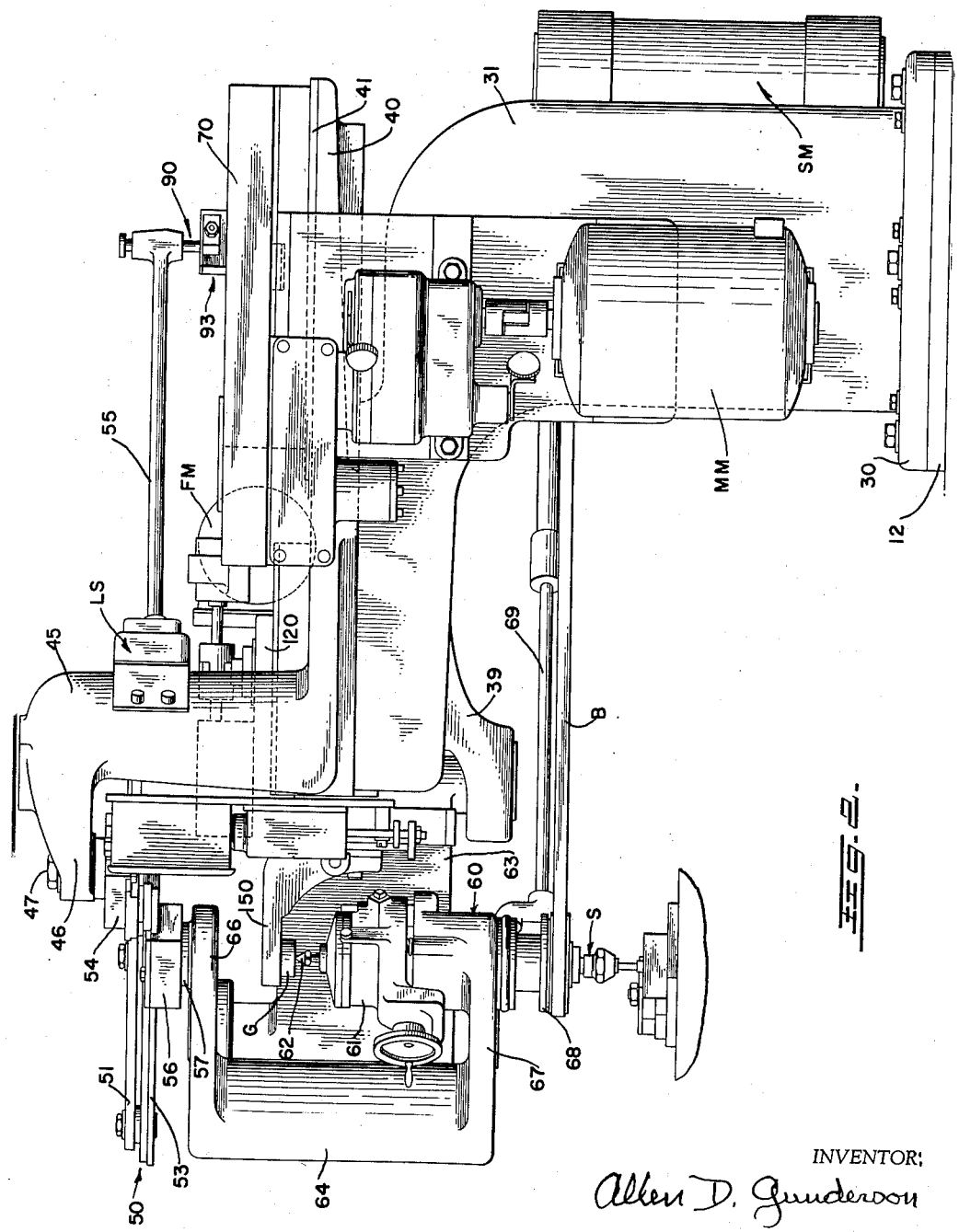
Fig. 2 is a view in front elevation of the machine of Fig. 1.

The cutter head and cutter spindle assembly forming unit 60 is adapted to be mounted for universal lateral movements in a horizontal plane under the control of the pantograph linkage 50 by a system of supporting links pivotally mounted for horizontal swinging on and from the arm 38 and ears 39 thereof which extend from one side of the slider head 40. This cutter head and cutter spindle unit mounting linkage, referring now to Figs. 1, 2 and 3, includes the horizontal link 63 pivotally mounted at one end thereof on the ears 39 of arm 38 by a vertically disposed pivot pin or stud 63' extending between and mounted at its opposite ends in the spaced ears 39, and a cutter head mounting and carrying link 64 which is pivotally coupled by pivot pin 65 to the outer free end of the link 63. This cutter head mounting link member 64 extends horizontally from the link 63 and is formed to provide the vertically spaced, generally parallel upper and lower arms 66 and 67 which are unconnected and spaced apart at their outer free ends to form an unobstructed space therebetween. The cutter head and cutter spindle unit 60 is mounted in vertically disposed position on the upper side of the lower arm 67 of the link 64 in position between that arm and the upper arm 66. The overall height or vertical dimension of the cutter head and cutter spindle unit 60 between the lower end thereof on arm 67 and the upper end or follower point of the pin 62 is less than the distance of the spacing between the arms 66 and 67, so that there is an unobstructed space provided between the upper end of the follower point 62 and the upper arm 66 of the cutter head unit mounting and carrying link 64. In this particular example in mounted position of the cutter head and cutter spindle unit 60 on the lower arm 67 of the link 64, the cutter spindle is suitably spring-loaded and, in effect, "floating," being continuously biased in the outward direction toward its inactive position. Thus the cutter spindle S may be fed downwardly to operative milling position by forces applied thereto through the follower pin 62 to overcome the forces applied by the spring-loading for the cutter spindle.

The cutter spindle S is mounted and journalled in and forms a component of the cutter head assembly or unit 60, and with the unit 60 in mounted position on the lower arm 67, the cutter spindle S itself extends downwardly through and a distance below the arm 67 of the link 64 on which it is mounted. A driven pulley 68 is mounted on and fixed to the cutter spindle S on the depending length thereof which extends below link arm 67 on which it is mounted. The driven pulley 68 is connected in driven relationship by a belt B with the driving pulley 37 which is mounted on the power shaft of the cutter spindle drive motor SM swingably carried by the arm 35. A push-pull rod 69 is connected between the lower arm 67 of the link 64 and the motor mounting or support plate 36 on such arm 35 to cause the link 64 and the cutter head unit 60 mounted thereon to swing together with arm 35 and the drive motor mounted thereon to thereby maintain the desired position and relation between the motor and its driving pulley 37 and the cutter spindle and its driven pulley 68 of the cutter head 60 carried by the link 64. The push-pull rod 69 is rotatably secured or coupled to the motor mounting plate 36 of the swingable arm 35 in position with its longitudinal axis passing through the vertical axis passing through the vertical axis or center about which pulley 37 is rotated. Such rotatable coupling is made by providing the push-pull rod 69 with a ring or collar at its outer end which is connected to the motor mounting plate 36 with the driving shaft of the motor and the pulley 37 mounted thereon for rotation relative thereto.

The pantograph linkage 50 has a spreader block 56 slidably mounted on that lower bar 53 thereof which is parallel with the opposite lower bar 53 from which the tracer arm 55 extends. The slider block 56 of the pantograph linkage 50 is pivotally coupled by means of a pivot pin or stud 57 with the arm 66 of the cutter head link 64 which is positioned directly therebelow. The slider block pivot pin 57 is positioned in axial alignment with the cutter spindle of the cutter head unit 60 mounted therebelow. Thus universal lateral movements in its horizontal plane of the pantograph linkage 50 under the control of the tracer arm 55 will correspondingly universally laterally swing the link 64 and the cutter spindle S of the cutter head unit 60 carried thereby universally laterally. The cutter spindle S is driven and rotated from its driving motor SM as it is universally laterally swung by the operation of the pantograph linkage 50 through the driving belt B, the arm 35 with the spindle drive motor SM mounted thereon swinging horizontally about the pivot pin 34 with the distance between the axis of the motor and the cutter spindle S being maintained constant by the push-pull rod 69 which transmits the movements of the link 64 as following movements of the cutter spindle driving motor SM.

The universal lateral movements of the cutter spindle S are effected through the actuation of the pantograph linkage 50 by the tracer arm 55 under the dictation and control of the powered master unit M of my present invention. This powered master unit M is mounted on the outer length of the slider head 40 of the machine and is spaced outwardly a distance from the pantograph linkage 50 as will be clear by reference to Fig. 3. The powered master unit M is removable for replacement by a master unit having a different pattern or master to be reproduced, as will be hereinafter explained.

The powered master unit M is basically comprised of a master plate 70 which has formed thereon a recess or pocket 71 open through the upper side of the plate, the side and end walls of which provide precisely finished and connected side surfaces 72 and end surfaces 73 which provide a continuous and uninterrupted endless master or pattern defining surface. It will be noted that with the pattern or master plate 70 the opposite end wall surfaces 73 of the pattern defining recess are formed on a radius and join and uninterruptedly merge with the opposite side wall surfaces 72. While a particular form, shape or contour of pattern or master defining recess 71 is shown for the master plate 70, it is to be understood that the variety of shapes, forms and contours for such a master defining recess is substantially infinite so that the invention is in no sense limited or restricted to any particular pattern or master within the practical limitations of one of these powered master units and of the reproducing operations which it is to dictate and control. As the powered master unit M of this example is of the chain drive type, the master plate 70 having the master recess 71 formed therein is provided with a groove opening throughout its length through the top surface of the plate to provide a chain way or chain guide channel 74. In this instance the chain way or channel 74 surrounds and conforms to the general contour of the master defining recess 71, as will be clear by reference to Fig. 3 in connection with Fig. 4.

The master plate 70 is provided with the spaced parallel slots 75 therethrough which in this instance are disposed with their longitudinal axes transverse to the master recess 71 and the chain way 74, being located between that chain way and the side edge of the master plate. A sub-base or slider plate 76 having a slide rib 77 thereon is slidably mounted on the outer length portion of a slider head 40 with the slide rib 77 slidably received and engaged in the slide way 41 of the slider head. Thus the sub-base or slider plate 76 is slidable in either direction, that is, inwardly or outwardly on slider head 40 along a straight line path longitudinally or lengthwise of the slider head. Suitable locking screws or bolts are provided for detachably securing the slider plate 76 in an adjusted position on the slider head 40, such screws or bolts being extended upwardly through the slot 42 which opens through the bottom of the slider head in the bottom of the slide way 41.

A master plate 70 is mounted on the slider head 40 in position with the slots 75 of the master plate disposed normal to and across the straight line path of adjustment of the slider plate on the slider head 40, with that half of the master plate 70 that has the master recess 71 and the chain way 74 therein inwardly from the slider head and slider plate toward the pantograph linkage mounting post 45. Thus mounted and positioned, it is to be noted that the master defining recess 71 and its surrounding chain way 74 are positioned disposed generally parallel with the slider head 40. The slider plate 76 has attached thereto in position extending vertically upwardly therefrom the locking blots or screws 78 which are headed at their upper ends, as by nuts threaded thereon, and which extend through the slots 75 in a master plate 70 for engaging on the upper side of the master plate, or suitable shoulders formed within and around the slots 75. Hence by loosening the bolts 78 the master plate 70 may be adjusted transversely of the slider head 40 in either direction along a straight line path normal to the path of adjustment of the slider path 76. This mounting arrangement of a master plate 70 and slider plate 76 on a slider head 40 provides for cross-compound movements of the master plate in order to adjust that plate and its master defining recess for work set-up purposes.

Figure 4:
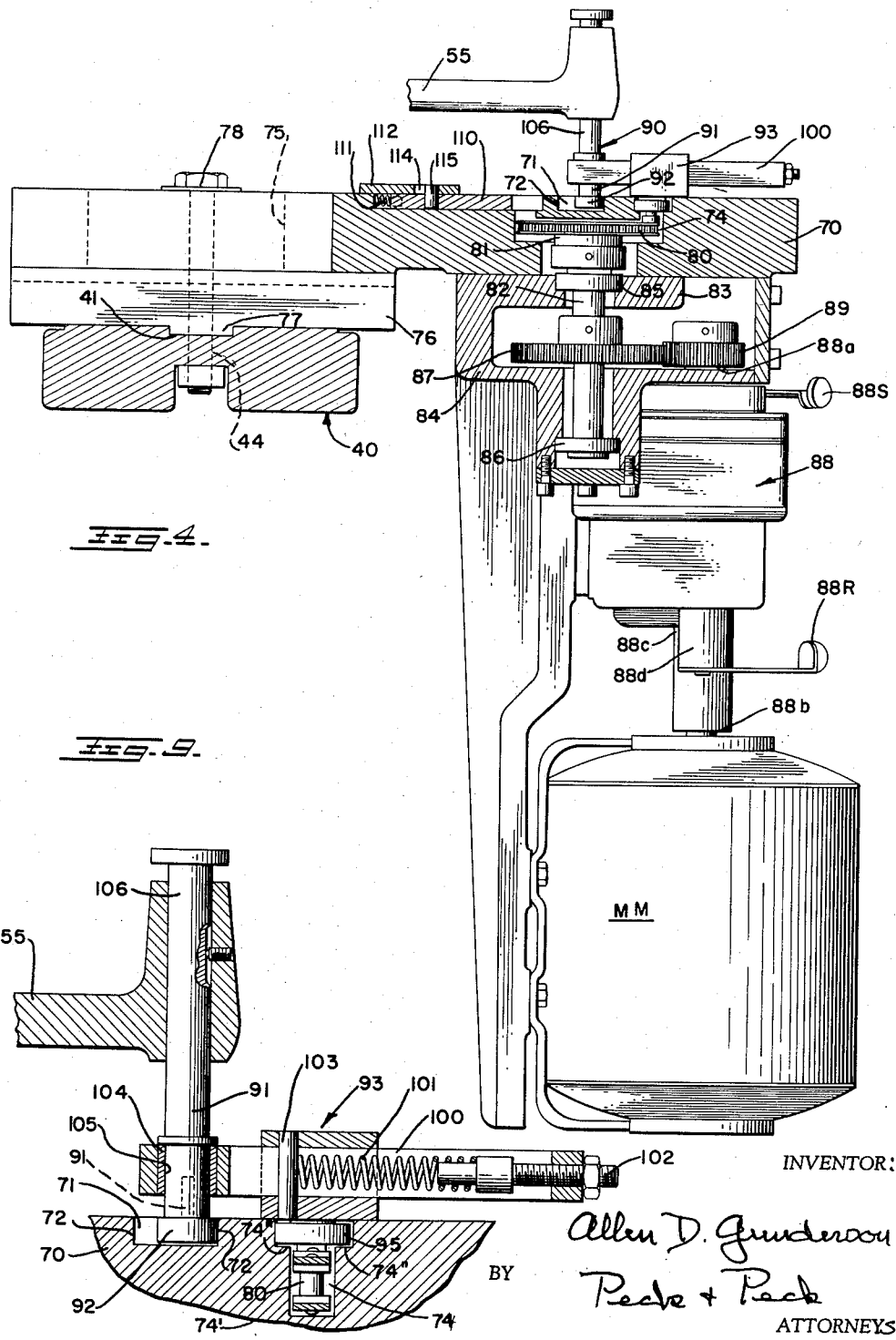
Fig. 4 is a view partly in vertical section and partly in side elevation of the powered master unit of my invention and its mounting and driving mechanism in operative position in the pantograph milling machine of Figs. 1 through 3.

A master plate 70 thus mounted on the slider head 40 is in a position such that the tracer arm 55 of the pantograph linkage 50 extends outwardly over and above that portion of the master plate in which the master recess 71 and the chain way 74 are formed and provided. In accordance with the principles of my invention the tracer arm 55 of the pantograph linkage 50 is operatively coupled with a chain drive mounted in the chain way 74 for causing a stylus or tracer mounted on the end of the tracer arm to follow the master defining surfaces 72 and 73 of the master recess 71. In carrying out these principles in the present example I provide an endless, roller-type chain 80 which is placed in the endless chain way 74 in slidable engagement at one side thereof with the bottom wall 74' of the chain way for movement of the chain therethrough and therearound. The chain 80 of the example master unit M is power driven by an electric motor MM, mounted on and carried by the master plate 70. The chain 80 is moved through and around its chain way 74 from its driving motor MM by a sprocket wheel 81 which is mounted in the master plate 70 in position at the inner curved end 73 of the chain way at the inner side of the bight or bend of the chain located in and passing around and through such curved end of the chain way. The chain driving sprocket 81 is horizontally disposed and is mounted on a driving shaft or spindle 82 which is journalled in a vertically disposed position on the upper horizontal arm 83 of a motor supporting and mounting bracket structure identified generally by the reference character 84. This mounting bracket structure 84 is attached to the master plate 70 located in position at the underside thereof and depending downwardly therefrom. The shaft 82 is journalled in anti-friction bearing assembly 85 and extends therefrom downwardly through the bracket structure 84. The shaft 82 at its lower end is journalled in an anti-friction bearing assembly 86 mounted on the bracket structure 84. A spur gear 87 is mounted on the shaft 82 for rotation therewith at a location spaced below the bracket arm 83 and the slot 81 thereabove. A reversible, infinitely variable speed drive unit 88 is mounted on the bracket structure 84 in position at the outer side of the shaft 82. The drive unit 88 has a vertically disposed power output shaft 88a extending upwardly therefrom. A spur gear 89 of smaller diameter than the gear 87 is mounted on the front end of shaft 88a in position on such in the plane of and in driving mesh with the gear 87. The motor MM of the powered master unit M is mounted and secured at the lower end of the bracket structure 84 mounted on the master plate 70 of the unit in position with its armature shaft 88b vertically disposed and extending upwardly therefrom in vertical axial alignment with the input shaft 88c of the infinitely variable speed drive unit 88. The input shaft 88c extends downwardly from the unit 88 and is operatively coupled in driven relation with the armature shaft 88b of the master unit motor MM, as shown in Fig. 4.

The infinitely variable speed drive unit 88 is provided with a manual control lever 88S which extends radially outwardly from the upper end thereof by which the operator may selectively set the unit for delivery of the required rate of speed of rotation of the output shaft 88a and thus determine the rate of rotation of the sprocket 81 and the rate of speed of movement of the chain 80 through and around its chain way. The motor armature 88b and the variable speed unit input shaft 88c are coupled by a suitable reversible coupling unit 88d which provides a radially outwardly extending manual control lever 88R by which the direction of rotation of the variable speed unit input shaft 88c may be reversed to thereby reverse the direction of movement of the chain 80 thorugh and around the chain way 74.

Figure 5:
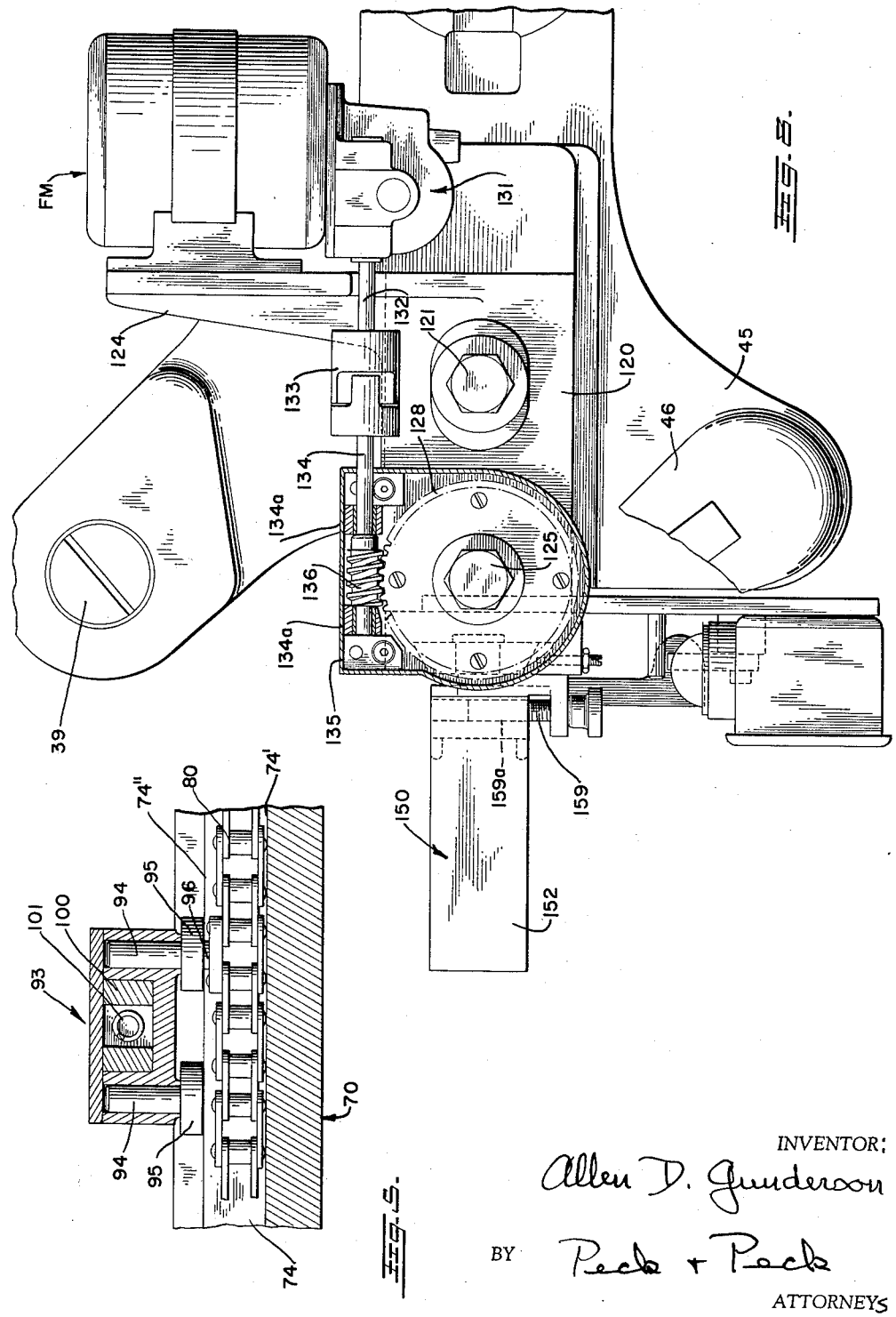
Fig. 5 is a detail vertical sectional view through a portion of the chain drive and the tracer spindle carriage of the pantograph milling machine of Fig. 1, taken as on the line 5—5 of Fig. 3.

The power driven roller chain 80 is adapted to move a tracer or stylus 90 which is coupled with and is adapted to actuate the tracer arm 55 of the pantograph linkage 50. The tracer or stylus 90 in this example is comprised by a pin or stud 91 on which there is journalled and rotatably mounted a tracer roller 92 which is positioned in the master defining recess 71 for rolling engagement on and around the master defining surfaces 72 and 73 of the master recess. The tracer roller 92 has a diameter less than the minimum width at any point thereon of the master recess 71 so that this tracer roller may be held in rolling contact against and moved around to follow the endless pattern surface provided by the outer sides of that recess. A tracer or stylus carriage 93 is provided for connection with the power drive chain 80 and is coupled with the tracer or stylus 90 for moving the latter for tracing engagement with and around the master defining surfaces of the recess 71 in the master plate 70. The carriage 93 mounts therein the spaced pins or studs 94 which depend therebelow and which mount the rollers 95 journalled on their lower ends below the carriage. The carriage 93 is mounted in operative position on a master plate 70 with the spaced rollers 95 positioned in the chain way 74 above the chain 80. In this specific example the chain way 74 has the upper portion thereof above the chain 80 therein formed of increased width to provide the spaced shoulders 74" above and at and around opposite sides and ends of the endless chain 80 from which the opposite vertical surfaces extend upwardly to form tracks against which the rollers 95 may have rolling contact as the carriage is moved around the chain way by powered drive of the chain 80. One of the roller mounting pins 94 of the carriage 93 is extended downwardly a distance below the other of the pins 94 to provide a driving link pin 96 which is pivotally coupled and connected to a link of the driving chain 80 in a manner which will be clear by reference to Fig. 5. Thus, movement of the chain 80 around the chain way 74 will correspondingly move and carry with it the tracer carriage 93 which is pivotally connected thereto at one point only provided by the driving pin 96.

A slider bar or coupling member 100 is slidably yieldingly mounted in and extending transversely through the carriage 93 with its inner end positioned over and above the pattern or master defining recess 71. The slider bar or coupling member 100 extends outwardly a distance across the master plate 70 to terminate with its outer end located spaced a distance inwardly from the outer edge of the master plate. The coupling member 100, in this example, takes the form of an open rectangular frame closed at its opposite ends and mounting therewithin a biasing spring 101 which may be of a coil type engaged at its outer end over an adjusting screw 102 threaded through such outer end of the member. The inner end of this biasing spring 101 is engaged against the outer side of a pin or lug 103 mounted in fixed position in the carriage 93 and extending upwardly therefrom into the hollow frame which forms the coupling member 100, as will be clear by reference to Fig. 9. Spring 101 is positioned between screw 102 and the pin or lug 103 on the carriage 93 under compression so that it acts to continuously bias the slidably mounted coupling member 100 outwardly through the carriage. The inner end of the slider bar or coupling member 100 is provided with a vertical bore therethrough in which there is mounted an annular micro bearing 104 which provides axially therethrough a bore 105 for pivotally receiving and journaling therein a follower pin mounted in the end of a tracer arm 55.

The tracer arm 55 of the pantograph linkage 50 extends outwardly over the chain way 74, and in accordance with my invention I pivotally couple the outer end of the tracer arm 55 to the slider or coupling member 100 of the chain driven carriage 93, so that movements of the carriage and the coupling member thereof are transmitted to and translated as horizontal swinging movements of the tracer arm. In this specific example I provide a follower pin 106 extending transversely through the outer free end of the tracer arm 55 with the follower pin extending into the bore 105 of the micro bearing 104 in the inner end of the slider or coupling member 100 so that the follower pin is rotatably mounted and journalled in and operatively connected to the coupling member 100. The lower end of the follower pin 106 may, as in the example hereof, be formed with an axial bore extending upwardly thereinto which fits down over and receives therein the pin or stud 91 of the stylus 90 with the follower pin 106 and the stud 91 being in axial alignment to thus connect the follower pin and stylus for lateral movements together as a single unit. As the chain way 74 may not run truly parallel with and around the master surfaces 72 and 73 of the master recess 71, it follows that the distance between the axes of the follower pin 106 and of the link pin 96 on the carriage 93 may not remain constant as the carriage and the stylus are moved through their cycle around the endless paths provided by the chain way 74 and the master recess 71. However, with the coupling member 100 being slidably mounted in the carriage 93 and being spring loaded by the spring 101, the coupling member is continuously biased outwardly relative to the carriage 93 to thereby yieldingly maintain the roller 92 of the stylus 90 in constant rolling contact with and against the pattern or master defining surfaces 72 and 73 of the master recess 71 in a master plate 70.

With the powered master M of the example pantograph milling machine thus operatively coupled with the follower pin 106 on the tracer arm 55 of the pantograph linkage 50, when the drive chain 80 is set into operation by its driving motor MM, such drive chain as it is moved around the continuous chain way 74 moves the carriage 93 and thereby faces the stylus 90 and the follower pin 106 which is connected in axial alignment therewith, to follow around the master defining surfaces 72 and 73 of the master recess 71. The movements of the stylus 90 and follower pin 106 connected therewith are transmitted to the tracer arm 55 which is swung horizontally to thereby universally laterally swing the pantograph linkage 50 and through the coupling of the latter with the cutter spindle carrying link 64 cause the cutter head 60 mounted on such link to be moved universally laterally over a work-piece or work station in precise and accurate scaled reproduction of the master defining surfaces 72 and 73 in the master recess 71.

As will be readily recognized by those skilled in this art the pantograph linkage 50 may have any desired selected ratio of reproduction thereof over the range of ratios of which that particular linkage is capable. The invention is in no sense limited to any particular pantograph linkage or other movement transmitting mechanism, or to any particular range of reproduction ratios.

With the chain type master unit M of this example, abrupt turns in the driving chain track which generally follows and conforms to the shape of the master defining surfaces, will tend to cause rapid acceleration of the feed of a cutter through the work-piece with resulting frequent cutter breakage. In order to overcome such tendency toward rapid acceleration of a cutter through a work-piece, my invention provides a chain brake or snubber arrangement on the master plate 70 of the master unit M. In the form of such a snubber herein disclosed a master plate 70 is recessed and there is mounted in such recess for slidable movements along a straight lined path radially toward and from the driving chain 80, a snubber plate 110 which is positioned in the horizontal plane of the rollers 95 of the carriage and which projects a slight distance into the path of such rollers. This snubber plate 110 is spring-biased continuously toward the path of the rollers 95 by a pair of biasing springs 111 and a suitable closure and guide plate 112 is secured over the outer portion of the master plate recess and the snubber plate 110 slidably mounted therein. Plate 112 has an elongated slot 114 therethrough in which there is slidably received a limit pin 115 for determining and limiting the distance of projection of the snubber plate into the path of the carriage rollers. In this instance this snubber plate 110 is positioned so as to engage with a re-entrant portion of the chain way immediately following the inner, relatively abruptly curved end of the chain way, and the inner edge of the snubber plate 110 is formed convex to generally conform and correspond to the radius of curvature about which such re-entrant portion is generated. The snubber plate 110 thus puts pressure against the carriage rollers 95 as they are forced therepast so that regardless of the amount of slack which the chain 80 may have, it cannot overrun but must be pulled through the section of the chain way into which the snubber plate 110 yieldingly projects.

The pantograph milling machine of this example is automatically brought to a stop upon the completion of its reproducing or milling cycle. In carrying out this feature of the invention, a limit switch LS is mounted on and incorporated in the machine for automatically opening the circuit to the master unit drive motor MM. The limit switch LS is mounted in fixed position on the outer side of the post 45 from which the hanger arm 46 for mounting the pantograph linkage 50 extends with this limit switch thus positioned between the post 45 and the adjacent inner end edge of the master plate 70. The limit switch LS may be of the micro-switch type, as shown in this example, to include a switch actuating pin or plunger 118 which is horizontally disposed to extend outwardly therefrom in line with and engaged by the adjacent side of the tracer arm 55 when that arm reaches a predetermined position at the adjacent end of the master recess 71 in the master plate 70 of the powered master unit M. The limit switch LS is of the normally closed type to normally close a circuit therethrough in which connected, but which, upon depression of the switch plunger 118 by engagement with the tracer arm 55, will open and thus open and break the circuit in which it is connected. As the machine of the example completes its tracing and reproducing cycle and the tracer arm 55 reaches the end of the master recess 71 at a location with the tracer 90 in such recess at a position therein which defines the end of the milling cycle, the limit switch LS will be engaged by the trace arm 55 and will depress the switch plunger 118 and open the switch. The limit switch LS is connected in the circuit to the powered master unit driving motor MM, and when opened by the tracer arm 55 at the end of the milling cycle, the motor MM is stopped and further operation of the powered master unit is likewise stopped.

A pantograph type milling machine of the instant example of the invention presents an operative organization for two-dimensional profile reproduction or milling where the milling operations may be performed at a constant depth of cut thoughout the milling cycle. In such operations the cutter spindle S may be set and fixed for a constant depth of cut when provided with a definite type and length of milling cutter and such setting can be obtained by means of what the art terms a "forming guide" positioned above and engaged by the follower pin or point 62 of a cutter head and spindle unit 60, or a cutter spindle in such a unit 60, if spring biased, may be set and fixed for a constant depth of milling cut as the cutter is universally laterally moved over a work-piece by the pantograph linkage under the dictation and control of the powered master unit of the machine.

However, the example machine includes as a self-contained component mechanism thereof a powered down feed by which the cutter on the cutter spindle may be progressively fed into the work-piece as the cutter performs the cutting operation therethrough while being universally laterally moved thereover under the direction of the powered master unit M. In the example machine the powered down feed organization includes a power driven master down feed cam which progressively feeds a cutter downwardly to predetermined depths through each cycle of one rotation of the down feed cam as synchronized with the tracer or stylus of the powered master unit M. Such a powered down feed mechanism of the invention may include a base plate or supporting frame structure 120 which is detachably secured on the forward length of a slider head 40 and which may provide at the side thereof a slide for slidably fitting into the slide way 43 of such slider head 40. Such an adjustable mounting and attachment of the base frame structure 120 may be carried out by a bolt 121 which extends down through the base 120 and through the slot 44 in a slider head 40 with the lower or under end of bolt 121 having threaded thereon a fastening nut 122. This frame structure 120 when in mounted and attached position has its outer end adjacent the inner side of the powered master unit M mounted on the slider head 40 and its inner end positioned adjacent the end of the slider head 40 but below the pantograph linkage 50 of the machine in which such down feed is incorporated.

The motor FM for driving such down feed mechanism is mounted with its armature or driving shaft in horizontally disposed position with its axis generally transversely disposed relative to the slider head 40 and the mounting base 120. Such driving motor FM so positioned is located in laterally offset position relative to the slider head 40 and the supporting base 120 by means of the laterally extending bracket structure 124 on and to which the motor FM is attached. In this particular example the down feed driving motor FM is positioned laterally offset from the base 120 at the left hand side thereof when facing the machine.

A stud shaft 125 is mounted in vertically disposed position fixed to and extending upwardly from the supporting base frame structure 120 adjacent the outer end thereof. This stud shaft 125 is in this instance positioned with its vertical axis passing through the longitudinal center of the supporting base frame structure 120 and the slider head 40. A cam spindle 126 is journalled on the stud shaft 125 by vertically spaced, annular anti-friction bearing assemblies 126a. The cam spindle 126 is formed to provide at the upper side thereof a radially outwardly extending horizontal flange 127 therearound to and around which flange there is attached and secured a worm wheel 128. A bell cam forming ring or annulus 129 is attached on the cam spindle 126 at and around the underside of flange 127. The cam ring 129 is formed of progressively varying vertical depths therearound to provide the annular cam surface 130 which is thus spaced progressively varying vertical distances around the cam ring from the horizontal plane of the upper surface of the supporting frame structure 120 on which the stud shaft 125 is mounted.

A drive is provided from the motor FM to the worm wheel 128 for rotating the cam spindle 126 and the bell cam 129 mounted thereon. This drive motor FM may, as in the example hereof, include an infinitely variable speed gear set or transmission 131 in operative connection therewith. The gear set 131 has a power or drive take-off shaft 132 extendfing inwardly therefrom substantially parallel with the longitudinal center of the supporting base frame structure 120. The inner end of this shaft 132 is connected into a coupling unit 133 which, in turn, is coupled with and transmits driving power to a driving shaft 134 in general axial alignment with the shaft 132. Shaft 134 extends inwardly from the coupling 133 from a housing or casing structure 135 which has therein the spaced bearing assemblies 134a in which the shaft 134 is journalled. A worm 136 is mounted on the shaft 134 intermediate the shaft bearings 134a in engagement and driving a mesh with the worm wheel 128 on the cam spindle 126. Thus the cam spindle 126 is power rotated from the motor FM to power rotate the cam 129 from the worm 136 and the worm wheel 128 which is in driven engagement with the worm.

Preferably the gear set or transmission 131 from the motor FM to the shaft 132 is of the variable speed type so that the rate of rotation of the bell cam 129 may be selectively determined to meet the spindle down feed requirements established by the conditions for any particular work-piece operation. In any instance where it may be found desirable or expedient the driving motor, such as motor FM of this example, may be of the reversible type or other reversing means may be provided of any of the well-known types in the drive from the motor to thereby reverse the direction of rotation of the master feed cam 129.

The outer end of the supporting base frame structure 120 is provided with a vertically disposed frame 141 which depends therefrom and which provides at the outer side thereof the laterally spaced, inwardly extending opposite side rails 142. At the lower end of the frame structure 141 and the vertical side rails 142 there is provided an end plate 143. A forming guide carriage 144 is vertically slidably mounted on and between the side rails 142 of the frame structure 141 for vertical straight lie movements upwardly and downwardly on the frame structure. The carriage 144 is continuously biased upwardly by springs 145 which may be of the coil type and which are interposed between the bottom or end plate 143 and the carriage 144. The lower ends of the springs 145 are engaged over positioning pins 145a on the bottom plate 143 and the upper end lengths of the springs are extended and received in vertical bores 145b formed in the carriage structure.

A forming guide bracket structure 150 which includes the base 151 and a forming guide mounting arm 152, is mounted and attached on the outer side of the carriage 144 by the base 151 which is secured in vertically disposed position on and against the outer side of the carriage. In such position the forming guide mounting arm 152 of the bracket structure 151 extends in horizontally disposed position over and above a cutter head and cutter spindle unit 60 of the machine. As it is necessary for set-up and adjustment purposes that the forming guide mounting bracket structure 150 be capable of adjustment both vertically and laterally or horizontally on and relative to the carriage 144, my invention provides for cross-compound adjustments of the bracket structure. In this instance such adjustment is provided for by vertically elongated slots 146 which are spaced apart vertically and which extend through the body of the carriage 144. An adjustment plate 153 is positioned against the outer side of the carriage 144 and between that carriage and the mounting base 151 of the bracket structure 150 which is positioned on and against the outer side of this mounting plate. The mounting plate 153 is provided with bores therethrough aligned wtih the carriage slots 146 and the mounting base 151 is provided with vertically spaced transversely elongated slots 154 therethrough which are aligned with and opposite the bores through the plate 153 and the vertically elongated slots 146 in the carriage. Headed attaching bolts 155 are extended through each of the mounting base slots 154 and inwardly through the bores in the plate 153 and the vertical slots 146 in the carriage 144. The bolts 155 are threaded at their inner ends into clamping nuts 156. Thus by loosening the bolts 155, the assembly made of the bracket structure 150 and the plate 153 may be adjusted horizontally and laterally on and independently of the plate 153 for a final adjusted position of the forming guide mounting arm 152. In this instance the plate 153 is provided with a transverse groove 157 thereacross and the inner side of the base 151 is provided with an inwardly extending transversely disposed rib 158 thereacross which is slidably received in the groove 157 in the plate 153. Thus the bracket structure 150 is constrained to straight line horizontal adjustments in either direction by rib 158 of mounting base 151 which is slidably received in the groove 157 in the plate 153. Horizontal lateral adjustments of the bracket structure 150 on the plate 153 of carriage 144 are effected by means of an adjusting screw 159 which is rotatably journalled on and which extends through a side of the carriage 144 with its inner end length threaded into a horizontally disposed transversely tapered bore 159a in the mounting base 151 of the bracket structure 150.

The spring loaded carriage 144 thus mounts and carries the forming guide mounting bracket structure 150 for vertical movements upwardly and downwardly as a unit assembly. Such upward and downward movements of the carriage 144 and the bracket structure 150 are dictated and controlled by the combined actions of the biasing springs 145 and the down feed cam 129 in accordance with the annular cam surface 130 provided by and around that cam. To this end a cam point or follower pin 160 is mounted in fixed position centrally on and extending vertically upwardly from the upper end of the carriage 144, with this cam point being yieldingly biased into sliding, cam surface following engagement with the cam surface 130 of the down feed cam 129 by the biasing action of the springs 145. Thus it is apparent that as the down feed cam 129 is power rotated from and by its driving motor FM, as the "high" portions of the cam engage with the cam point 160 such point with its carriage 144 and the forming guide mounting bracket 150 will be forced downwardly. As "low" portions of the cam surface 130 reach the cam point 160, that point with its carriage 144 and the forming guide 150 will under the action of the biasing springs 145 be forced upwardly with the cam point 160 maintained in close cam following engagement with the surface 130.

A forming guide G in the form of a block 161 is removably secured and attached in horizontally disposed position at the underside of the arm 152 of the bracket structure 150 and this forming guide block 161 provides the forming guide surface 162 at the underside thereof. In the mounted and assembled position of a down feed mechanism on the slider head 40 of the pantograph milling machine of this example, the arm 152 of the forming guide mounting bracket 150 extends horizontally inwardly from the carriage 144 in position extending over and above the cutter head and cutter spindle unit 60 with the forming guide follower pin 62 in slidable engagement with the under surface 162 of the forming guide G. The area of surface 162 is, of course, sufficient to cover the area through which the pin 62 is universally laterally moved with the unit 60 as that unit is universally laterally moved by the pantograph linkage 50 in the reproduction operation on a work-piece of the pattern or master defined by the powered master unit M of the machine. As the cutter head and spindle unit 60 is continuously spring biased upwardly, it follows that the down feeding movements of such unit are effected by the "high" portions of the down feed cam 129 by down displacement of the carriage 144 and the forming guide G carried therefrom in engagement with the pin 62 as the unit 61 is universally laterally moved over the work-piece, while upward movements of the forming guide as the cam point 160 follows the rises to the low portions of the cam surface 130 will be followed by a cutter head and spindle unit 60 with the pin 62 of that unit maintained in engagement with the forming guide G under the action of the spring loading and upward biasing thereby of the unit 60. In the example machine the down feed cam 129 has the cam surface 130 thereof generated so as to provide for progressive down feed of a cutter spindle into the work-piece as the cutter spindle moves the tool in cutting engagement through the work-piece with such progressive down feed being completed upon each milling cycle or pass of a milling cutter through the work-piece. In other words, the cam 129 has its cam surface 130 so generated and formed that the maximum "low" point or portion of cam surface 130 is engaged with the cam point 160 at the start of a one revolution cycle with the cutter spindle S thus raised to its highest point for the cycle, so that as the cam 129 rotates the cam surface 130 thereof will progressively downwardly feed the cutter spindle until the maximum "high" point of cam surface 130 is reached at the end of one complete revolution. Upon the completion of such a revolution the cam surface 130 provides an abrupt transition from its maximum "high" to its maximum "low" point for the start of the next cycle. Obviously feed cams presenting cam surfaces of other forms than the progressive feeding cam of this example may be employed as required for a particular reproduction on any particular work-piece. Such cams may provide "dwells" for periods of cutting at constant depths or may provide "high" and "low" portions in any desired sequence or arrangement or may start a cycle at maximum depth and then progressively feed upwardly through decreasing depths, as my invention is not limited to any particular form of cam or work-piece produced therewith.

The example machine which is set up and which is mastered for a particular reproducing operation in a work-piece in which the work-piece is finished-milled to substantially constant depth, has the down feed mechanism of the machine provided with a forming guide G having the contact or guide surface 162 of flat planar form in a truly horizontal plane. Thus the follower pin 62 of a cutter head and spindle assembly unit 60 moves over and across this planar guide surface 162 under the control of a pantograph linkage 50 as the forming guide G is fed downwardly under the control of the down feed cam 129. However, my invention contemplates and includes the use of forming guides having contoured guide surfaces, either concave or convex or any other suitable or desirable contour for the purpose of obtaining a three-dimensional effect in the reproducing or milling operations. With such a contoured forming guide, in addition to the down feed of the forming guide by a down feed cam, cutter spindle S through a unit 60 in which it may be included, is caused to follow the contour of the guide surface of a forming guide and to thus be vertically raised and lowered in accordance with the contour of that surface and the portions thereof being engaged by the follower pin 60 as that unit is universally laterally displaced through a pantograph linkage 50 and tracer arm 55 under the control and dictation of a master unit, such as the master unit M of the example machine.

Figure 6:
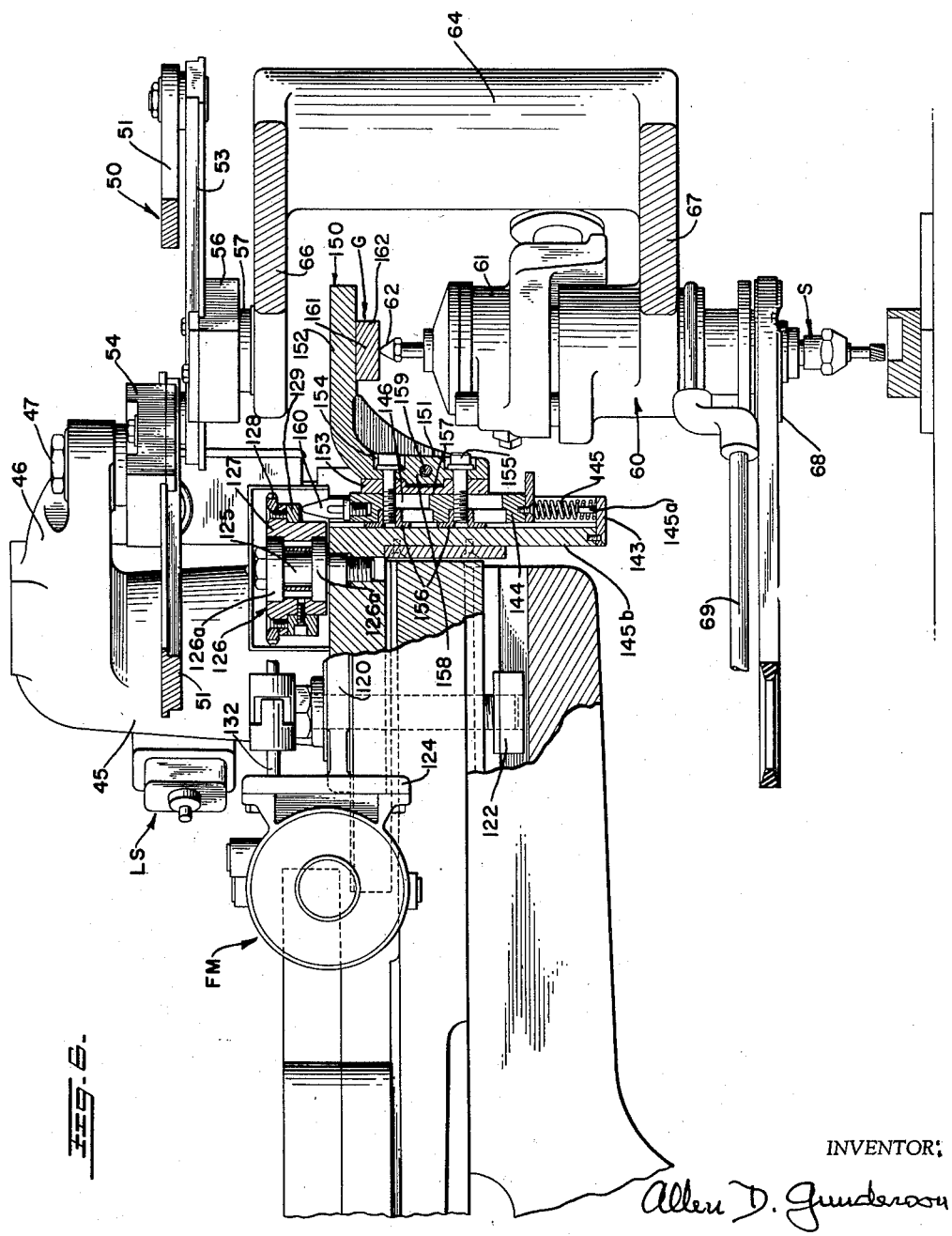
Fig. 6 is a view partly in side elevation and partly in vertical section of the pantograph milling machine of Fig. 1, with the forming guide and portions of the down feed mechanism therefor being shown in vertical section with the forming guide in operative relation with the cutter spindle unit shown in side elevation.
Figure 7:
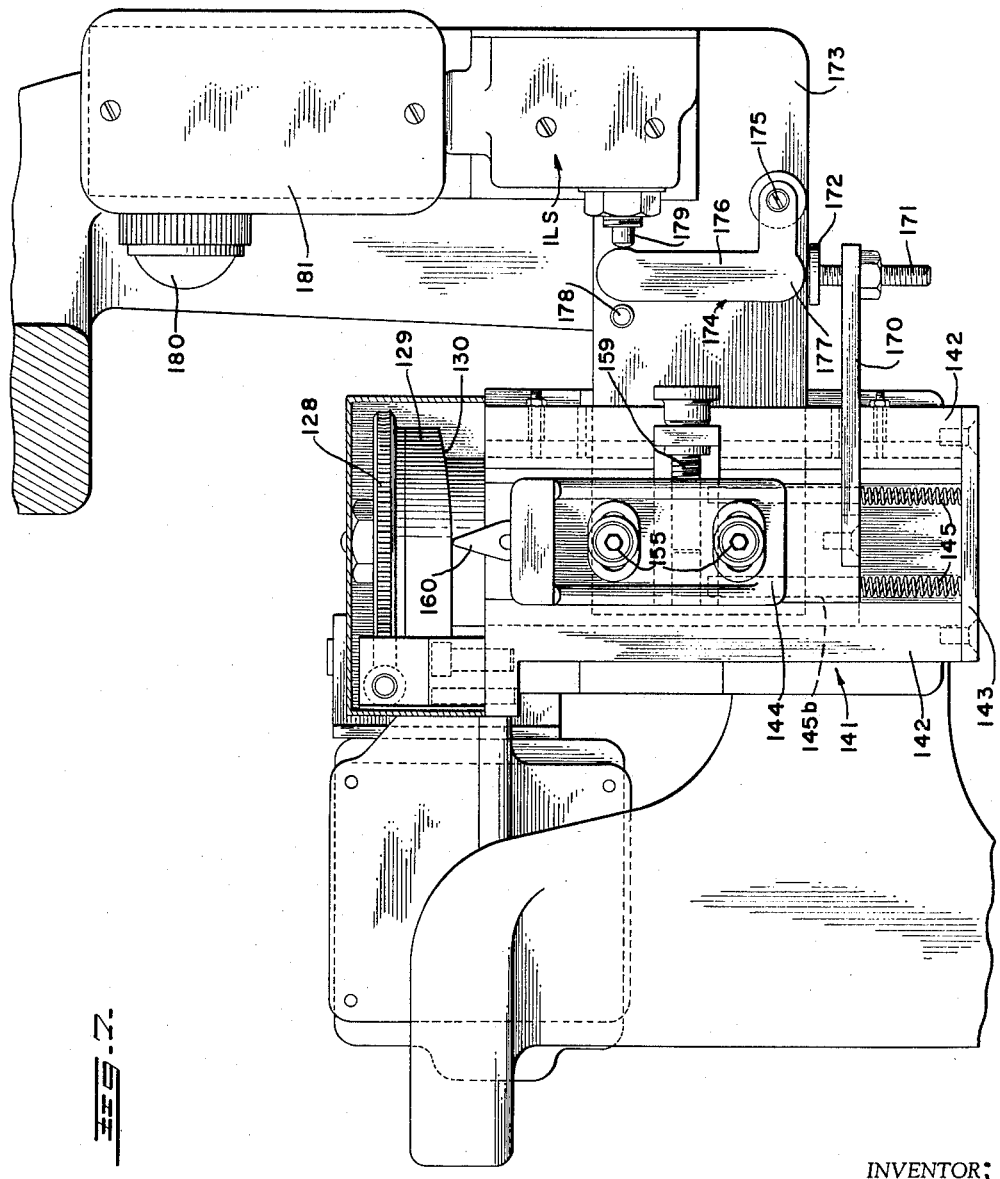
Fig. 7 is a view in front elevation of the down feed cam, forming guide carriage and associated mechanism of the machine of Fig. 1.

The down feed mechanism of the example pantograph milling machine includes a limit switch 1LS which controls the down feed motor FM for the down feed mechanism. Referring now to Figs. 6, 7 and 8, the carriage 144 mounts and carries an arm 170 which extends laterally outwardly from one side thereof and which is vertically displaced upwardly and downwardly with the upward and downward feed movements of the carriage. At its outer end the arm 170 adjustably mounts therein an abutment pin 171 in vertically disposed position with its upper end provided with the abutment head 172. A bracket structure 173 extends horizontally and laterally outwardly from the supporting base frame structure 120 in position located above and generally parallel with the arm 170. A crank member 174 is pivotally mounted on the bracket 173 by a pivot pin 175. The crank member 174 has the long arm 176 thereof disposed in vertically upwardly extending position above and in general vertical alignment with the abutment pin 172. The long arm 176 of the crank member 174 is positioned for engagement of the lower end 177 thereof, with the abutment head 172 of pin 171. The bracket 173 mounts therein a limit pin 178 located at the inner side of arm 176 adjacent the upper end thereof for limiting inward swinging of the crank member 174.

The limit switch 1LS in the example hereof is of the micro-switch type and is mounted and secured in position on the bracket 173 at the outer side of crank member 174. The limit switch 1LS is provided with an inwardly extending, horizontally disposed actuator pin or plunger 179 which is adapted to be engaged by the adjacent upper end of arm 176 of crank member 174 when the latter member is swung by engagement with abutment pin 171 on upward displacement of that pin with the carriage 144. The limit switch 1LS is of the normally closed type, that is, when the plunger 179 is in its outwardly projected position the switch is closed to thus close a circuit therethrough in which the switch is connected. When the switch plunger 179 is pressed inwardly by outward swinging of the crank member 174 the switch is opened to open a circuit thereunder in which the switch is connected. If desired, as in the present example, a signal light 180 and a mounting housing therefor 181, is mounted on the upper end of the limit switch 1LS and is connected into any usual circuit (not shown) controlled from the limit switch in order to give a visual signal to the operator of the condition of such limit switch 1LS and of the down feed motor FM which it controls.

While the down feed mechanism of this example is powered by an electric motor, it is to be understood that a down feed mechanism is not limited to any particular form or type of power, as such a feed mechanism may be operated by pressure fluid, by spring forces, mechanically or manually within the contemplation and intention of the invention.

A profile milling operation with the example pantograph milling machine of the invention is carried out under the control and dictation of the powered master unit M with progressive feed of the cutter spindle S into a work-piece being controlled and determined by the particular down feed cam 129 with which the machine is provided. The profile milling operation continues until the tracer 90 has been driven completely around and through the pattern or master recess 71, that is, until the tracer reaches its "home" position. As the tracer 90 reaches home position, the tracer arm 55 engages the plunger switch 118 of the limit switch LS and thus opens the circuit to the motor M so that the cycle of operation is stopped. On the completion of the down feed cycle as set for the example the crank member 174 is swung outwardly so that the plunger 179 of limit switch 1LS is opened to brake the circuit to the down feed motor FM and thus stop down feeding operation.

Upon the completion of a cycle of milling operations, with the down feed mechanism of the type disclosed in the example machine, the cutter spindle S will have been automatically raised or elevated from working position in the work-piece by the spring loading of the cutter head and cutter spindle unit 60 as the unit under such loading displaces vertically upwardly in following the upwardly displacing forming guide G which rises under the control of the down feed cam 129 and the down feed carriage biasing springs 145. Hence, upon the completion of the milling cycle and the automatic stopping thereof, the cutter spindle S will also have been automatically raised to position clear of the completed work-piece.

In the operation of the example machine, due to the inclusion in the powered master unit M of the infinitely variable speed drive unit 88 and of the reversible coupling unit 88d, the rate of movement of the master unit is infinitely variable in either direction. Thus the machine provides extreme flexibility and wide range of operation of the powered master unit and the important requirement for the maintenance of the correct feed and speed on a cutter spindle for the most efficient operation of the machine can be fully met. In other words, the cutter spindle may be adjusted within fine limits in the rate of movement of feed thereof laterally through a work-piece and the rate of speed thereof into the work-piece. Due to the provision in the powered master unit for reversing the direction of movement of a tracer through and around its master recess, both climb and conventional milling can be carried out any desired rate of speed.

It will also be evident that various changes, modifications, variations, substitutions, eliminations and additions may be resorted to without departing from the broad spirit and scope of my invention, hence I do not desire or intend to limit my invention in all respects to the specific examples herein disclosed except as may be required by any intended specific limitation thereto appearing in any of the claims hereto appended.

What I claim is:

1. In combination, a master plate provided with a master recess therein forming a master surface therealong; a tracer member in said recess mounted for movements in tracing engagement with and along said master surface; a driving chain mounted in said master plate for movements through and constrained to a path spaced from and along said master surface; a carriage coupled with said driving chain for movements thereby and therewith along said path of movements of said driving chain; means coupling said carriage with said tracer member for movements of the latter by said carriage along said master surface in tracing engagement therewith; and powered means in driving connection with said driving chain.

2. In the combination of claim 1, said master plate including a chainway spaced from and along said master recess; said driving chain being mounted in said chainway; and said carriage including a guide roller having roller bearing engagement with the surfaces of said master plate around and defining said chainway.

3. In the combination of claim 1, said means for coupling said tracer and said tracer arm including, a slide member on said carriage movable relative thereto, said tracer being coupled to said slide member, and biasing means acting to continuously bias said slide member in a direction to yieldingly maintain said tracer member in tracing engagement with said master surface.

4. In the combination of claim 1, a single coupling pin pivotally connecting said carriage to said driving chain.

5. In the combination of claim 1, a single coupling pin connecting said carriage to said driving chain, and a pin member pivotally connected with said tracer in axial alignment therewith.

6. In the combination of claim 1, a pin member pivotally connected with said tracer in axial alignment therewith.

7. In the combination of claim 1, snubbing means including a spring loaded snubber plate adjacent said driving chain yieldingly engaged against said carriage as the latter is moved therepast by said driving chain.

8. In the combination of claim 1, snubbing means in the path of said carriage for engagement thereby as said carriage is moved therepast by said driving chain.

9. In the combination of claim 1, a reversible and variable speed transmission connected between said powered means and said driving chain.

10. In combination, means providing a master surface; a tracer member mounted for movements along said master surface in tracing engagement therewith; means providing a track along and spaced from said master surface; a carriage on and guided by said track for movements therealong; means connecting said carriage with said tracer; and means for moving said carriage along said track.

11. In combination, means providing a master profile surface; means providing a track spaced from and along said master profile surface; carriage means on said track for movements therealong guided thereby; means for moving said carriage means along said track; a tracer member mounted for movements to and from tracing engagement with said master profile surface and for following movements therealong in tracing engagement therewith; and coupling means connecting said tracer member with said carriage means.

12. In combination, a master profile surface; track means spaced from and extending along said master profile surface providing a path therealong corresponding substantially to the path defined by and along said master profile surface; carriage means on said track for movements therealong constrained to the path provided thereby; means for moving said carriage means along said path provided by said track means; a tracer member mounted for movements to and from tracing engagement with said master profile usrface and for following movements therealong in tracing engagement therewith; coupling means connecting said carriage means with said tracer means; said coupling means being mounted for movements toward and from said master profile surface; and biasing means acting to continuously bias said coupling means in a direction to maintain said tracer member in tracing engagement with said master profile surface.

13. In combination, a master profile surface defining a profile path therealong; carriage means movable along and constrained to a path spaced from and along said master profile surface; means for moving said carriage means; a coupling member mounted on and carried by said carriage means for movements thereon independently thereof toward and from said master profile surface; a tracer member mounted for movements toward and from said master profile surface and for following movements therealong in tracing engagement therewith; said tracer member being connected to and movable with said coupling member; and biasing means continuously yieldingly biasing said coupling member in a direction to yieldingly maintain said tracer member in tracing engagement with said master profile surface.

14. In combination, a master profile surface; carriage means mounted for movements along and constrained to a path spaced from and along said master profile surface; powered means for moving said carriage means along its said path; a coupling member mounted on and carried by said carriage means for movements therewith and for movements independently thereof toward and from said master profile surface; a tracer member mounted for movements in tracing engagement with and along said master profile surface; coupling means connecting said carriage means with said tracer member; and means for retarding acceleration of movement of said carriage means along its said path.

References Cited in the file of this patent

UNITED STATES PATENTS

| | | |
|---|---|---|
| 2,359,704 | Woody | Oct. 3, 1944 |
| 2,537,806 | Woody | Jan. 9, 1951 |
| 2,557,876 | Klema | June 19, 1951 |
| 2,645,161 | Stuart et al. | July 14, 1953 |
| 2,818,787 | Gunderson | Jan. 7, 1958 |